June 13, 1950

R. C. ALLEN 2,511,682

COOKING UTENSIL COVER

Filed April 29, 1949

INVENTOR.
RUSSELL C. ALLEN
BY A.S. Knoll
ATTORNEY

Patented June 13, 1950

2,511,682

UNITED STATES PATENT OFFICE 2,511,682

COOKING UTENSIL COVER

Russell C. Allen, Fort Atkinson, Wis.

Application April 29, 1949, Serial No. 90,500

3 Claims. (Cl. 220—44)

The present invention relates to cooking utensil covers used for cooking as well as browning the food. In order to most efficiently brown food, a certain amount of moisture must be removed, in a proportional time required to cook the food.

Foods such as steaks, chops, hamburgers, fish, potatoes or the browning of stock for gravy may be cited as good examples for illustration. If one trys to fry steak with a closed cover it would not become brown in a reasonable time and would be more or less similar to a steamed or stewed process.

With my improved cooking utensil cover, when the foods are fried in oil or fats, the grease and fats are prevented from escaping and collecting on the stove, fixtures or walls of the room; nevertheless the prepared food will be better than when prepared in an open pan.

Novel features of my invention include what I call an eliminator which may be attached to the under side of the cover for producing a closed lid. This member, when used for eliminating purposes is secured concentrically on the upper side of the lid with a very small central contacting surface on the lid, so as to maintain a low temperature of this member, whereby when it is contacted by the escaping steam and vapor it will be condensed as it impinges the under surface of the eliminator and before entering the room.

Due to the shape and lower temperature of the eliminator, the steam and vapor is blanketed under the large concaved surface of the eliminator causing the vapor to travel slowly and the condensate to collect under and on the eliminator thus to physically trap as condensate a large percentage of the vapor and odor that otherwise would escape into the room.

If the steam and vapor were allowed to escape too rapidly and at too high a temperature the fine particles of grease and odors would float into the room where they would settle on the stove, walls and furniture in the room.

The principal object of my invention is to trap the steam or vapor before it reaches the room and to largely prevent odors from escaping into the room; therefore I provide a number of relatively large openings in the lid which are positioned concentric with the lid and substantially under the concave surface of the eliminator, the outer surface of the eliminator being spaced a considerable distance above the lid so the vapor etc., will pass slowly out of the pan and into the concave surface of the eliminator and from under the periphery of the eliminator.

I consider the next above statements as outlining the basic function of my device which is made possible because of the lower temperature of the eliminator and the slow movement of the vapor as it passes out of the pan, impinges the eliminator and then escapes from under the edge of the eliminator.

To these and other useful ends my invention consists of parts, combinations of parts or their equivalents and mode of operation as hereinafter described and claimed and shown in the accompanying drawings in which:

Figure 1:
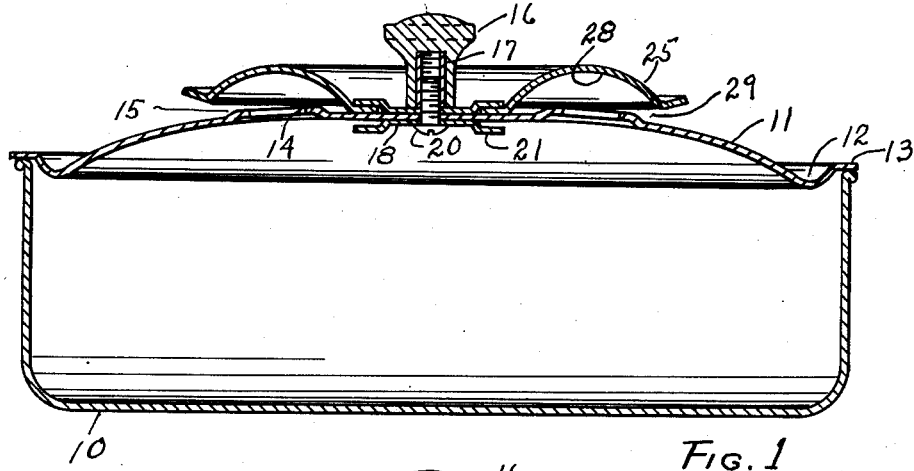
Fig. 1 is a transverse sectional view of my improved cooking utensil cover and positioned on a frying or stewing pan.

As thus illustrated, 10 designates a frying or stewing pan. Numeral 11 designates the base portion of my improved lid which is shaped as illustrated in the figures, the periphery of this member being formed in the shape illustrated in Figures 1 and 2, wherein an annular depression 12 is provided with a flat annular surface 13 which lies on the top edge of member 10 as illustrated in Figure 1. Thus any liquid material that may collect on the top of member 11 will be trapped in groove 12.

I provide preferably six concentrically positioned openings 14 in member 11 having a diameter about as illustrated relative to the size of member 11 with upturned edges 15, whereby accumulation of liquid on the top of member 11 will not drain back into the pan but will flow into depression 12. I provide a composition handle 16 having moulded therein a threaded sleeve 17. I also provide two washers 18—18 having openings 19 in their centers so they may be attached to member 11 by means of a screw 20 as clearly illustrated in Figures 1 and 2. Members 18 are preferably provided with two offset ears 21 having a shape as illustrated in the figures.

Figure 2:
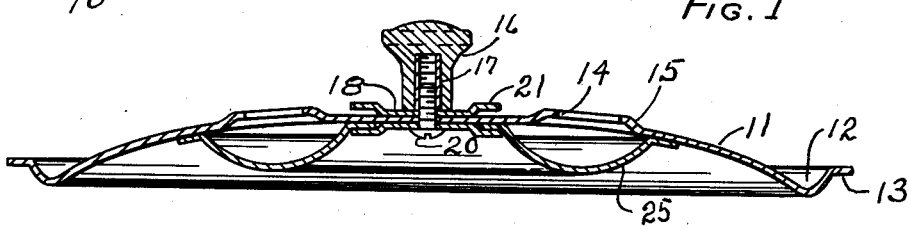
Fig. 2 is a transverse sectional view of my improved cooking utensil cover with the eliminator attached to the underside of the cover for closing the outlets in the cover.
Figure 3:
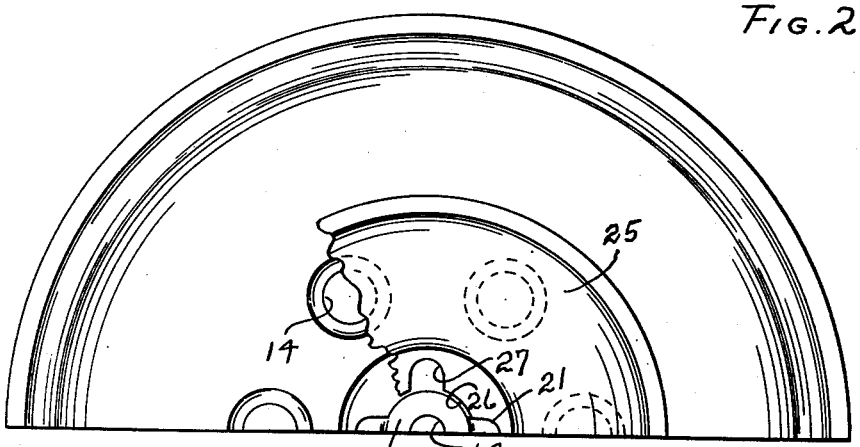
Fig. 3 is a fractional top view of the cover and eliminator as shown in Figure 1.
Figure 4:
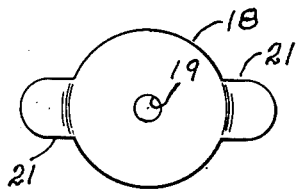
Fig. 4 is a top view of the holding washer and Figure 5 is a side view of the washer as shown in Figure 4.
Figure 5:
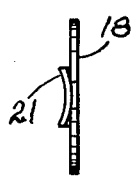

I provide an eliminator 25 with an opening 26 therein adapted to fit loosely around members 18 and having preferably cut away portions 27 which are slightly larger than projections 21 so member 25 may be placed in the position shown in either Figure 1 or 2. When member 25 is in the position shown in Figure 2, the peripheral surface of this member is adapted to fit snugly against the under surface of member 11, thus making a closed cover. When member 25 is in the position shown in Figure 1 it will be seen that there is a large concave annular surface 28 positioned around and over openings 14 and a distance therefrom and a large annular opening 29 is also provided.

The relatively small contact of member 25 with member 11 and the large area of this member exposed to the atmosphere, tends to maintain a relatively low temperature, a temperature which will readily condense vapor or steam as it passes through openings 14 and contacts the under surface of member 25.

Thus member 25 will condense and prevent vapor and steam from escaping into the room and collect the condensate on the under surface of member 25. As the steam or vapor is condensed and collected on this under surface it may drop on member 11 and find its way into annular depression or trench 12. The condensate on surface 28 and member 11 will tend to collect or absorb any minute particles that cause odors. Thus as has been proven by many practical tests, the major portion of the minute particles that cause vapor and odors will be trapped by the condensate, thus to reduce the presence of odors and vapor in the room to a minimum.

It will be seen by scrutinizing Figures 1 and 2 that members 16 and 18 may be easily removed from member 11, if it is desired to thoroughly clean these members; that applicant's lid may be closed by reversing member 25 as shown and described and that the device is suitable for use as a lid for stewing or frying pans or for other purposes, and that applicant's design is simple, easily manufactured at low cost and that it occupies a minimum space when stored.

It will be understood that minor detail changes may be made in the designs shown without departing from the spirit and scope of my invention as recited in the appended claims.

Having thus shown and described my invention, I claim:

1. A lid for a cooking utensil having a number of relatively large openings therein and arranged concentrically in spaced relation and positioned a considerable distance from the center of the lid, a handle secured to the center of the lid, an eliminator and means for detachably mounting the eliminator concentrically on the lid and having a diameter which is greater than one half the diameter of the lid, the area of the contacting surfaces between the eliminator and lid being relatively small, said eliminator having a relatively large annular concave under surface positioned over and a distance above said openings, the area of the surface between the periphery of said concave and the lid being equal to the total area of said lid openings, said eliminator mounting comprising a relatively small washer having a number of offset projections on its periphery, a handle with means for holding the washer on the top of the lid, an opening in said eliminator slightly larger than said washer, cutaway portions in the opening in the eliminator slightly larger than the projections on the washers, whereby the lid may be positioned around the washer and locked into position by being turned.

2. A device as recited in claim 1 including, another washer similar to the first washer being reversed and positioned under the lid and secured thereto by means of said handle fastening, whereby the eliminator may be reversed and attached to the underside of the lid, the shape of the lid and eliminator adapted to cause the periphery of the eliminator to hug the underside of the lid for closing said lid outlets.

3. A device as recited in claim 1 including, the outer periphery of said lid having a flat annular surface adapted to lie on the top of the cooking utensil, an annular depression adjacent said flat surface forming a trench for trapping any liquid that may form on the top of the lid.

RUSSELL C. ALLEN.

REFERENCES CITED

The following references are of record in the file of this patent:

UNITED STATES PATENTS

| Number | Name | Date |
| --- | --- | --- |
| 1,149,289 | Post et al. | Aug. 10, 1915 |
| 1,961,571 | Robinson | June 5, 1934 |
| 2,415,613 | Sulak | Feb. 11, 1947 |
| 2,428,894 | Serio | Oct. 14, 1947 |